Jan. 15, 1946.   J. H. REYNOLDS   2,393,188
INSPECTION MACHINE FOR PACKAGED GOODS
Filed Jan. 25, 1943   5 Sheets-Sheet 1

Inventor
James H. Reynolds
Attorney

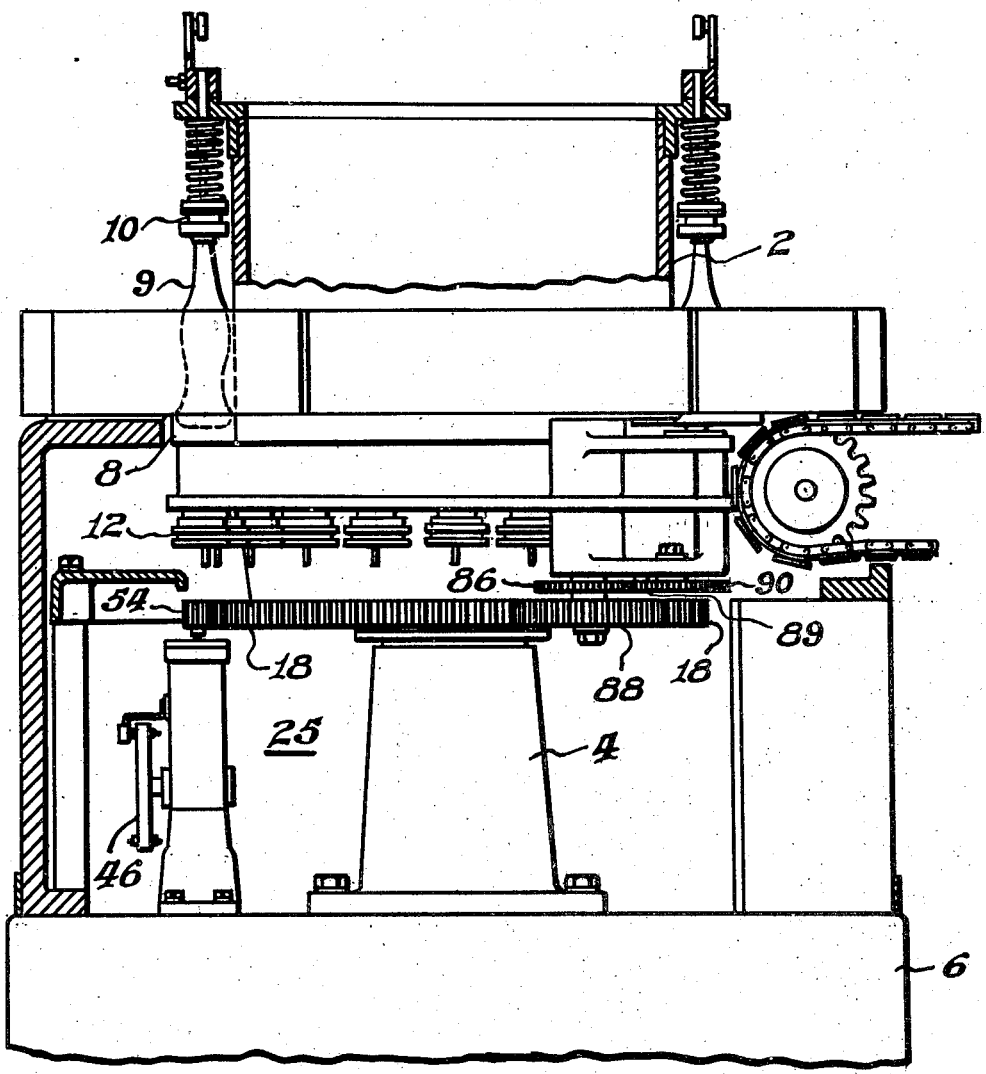

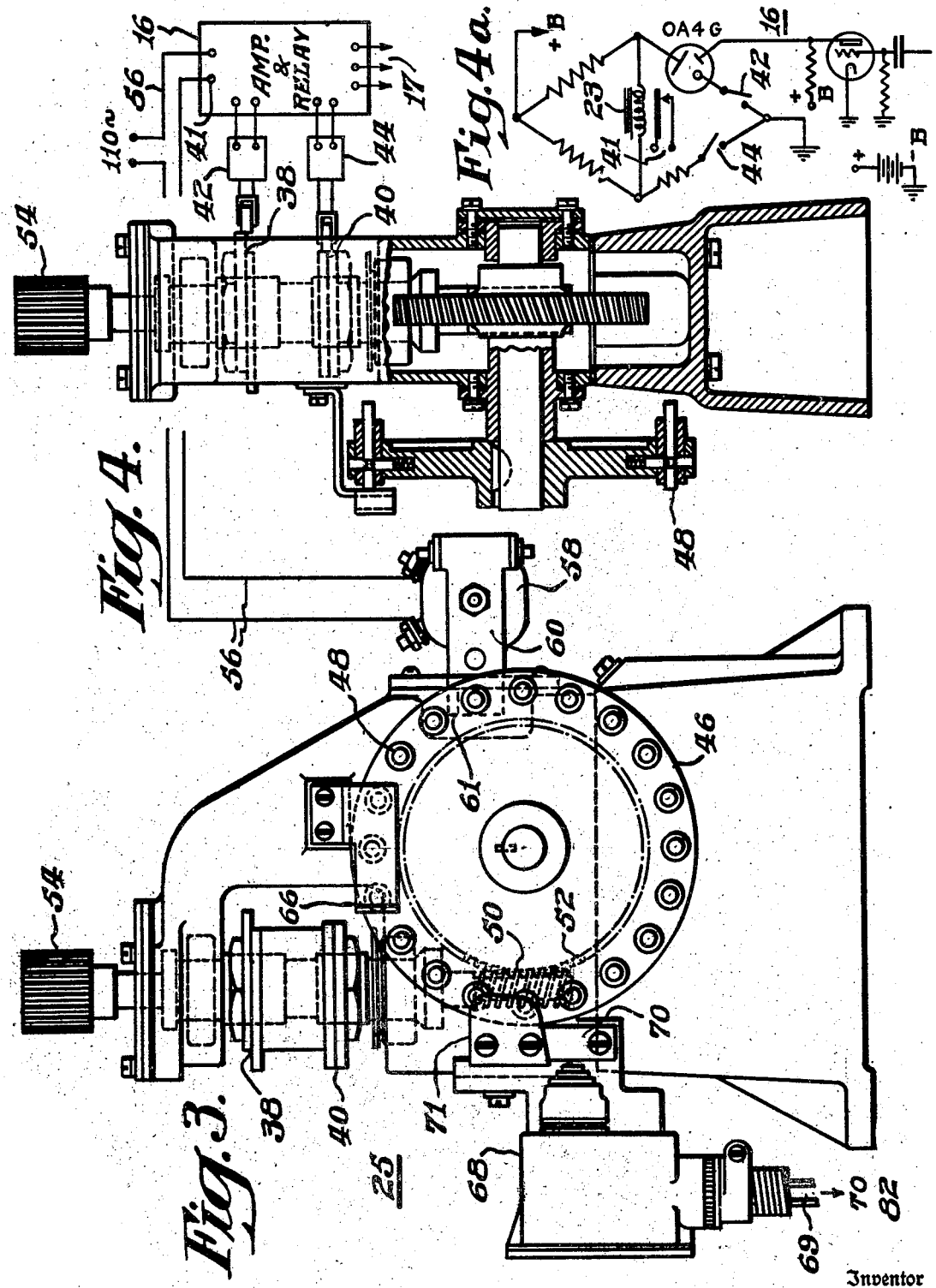

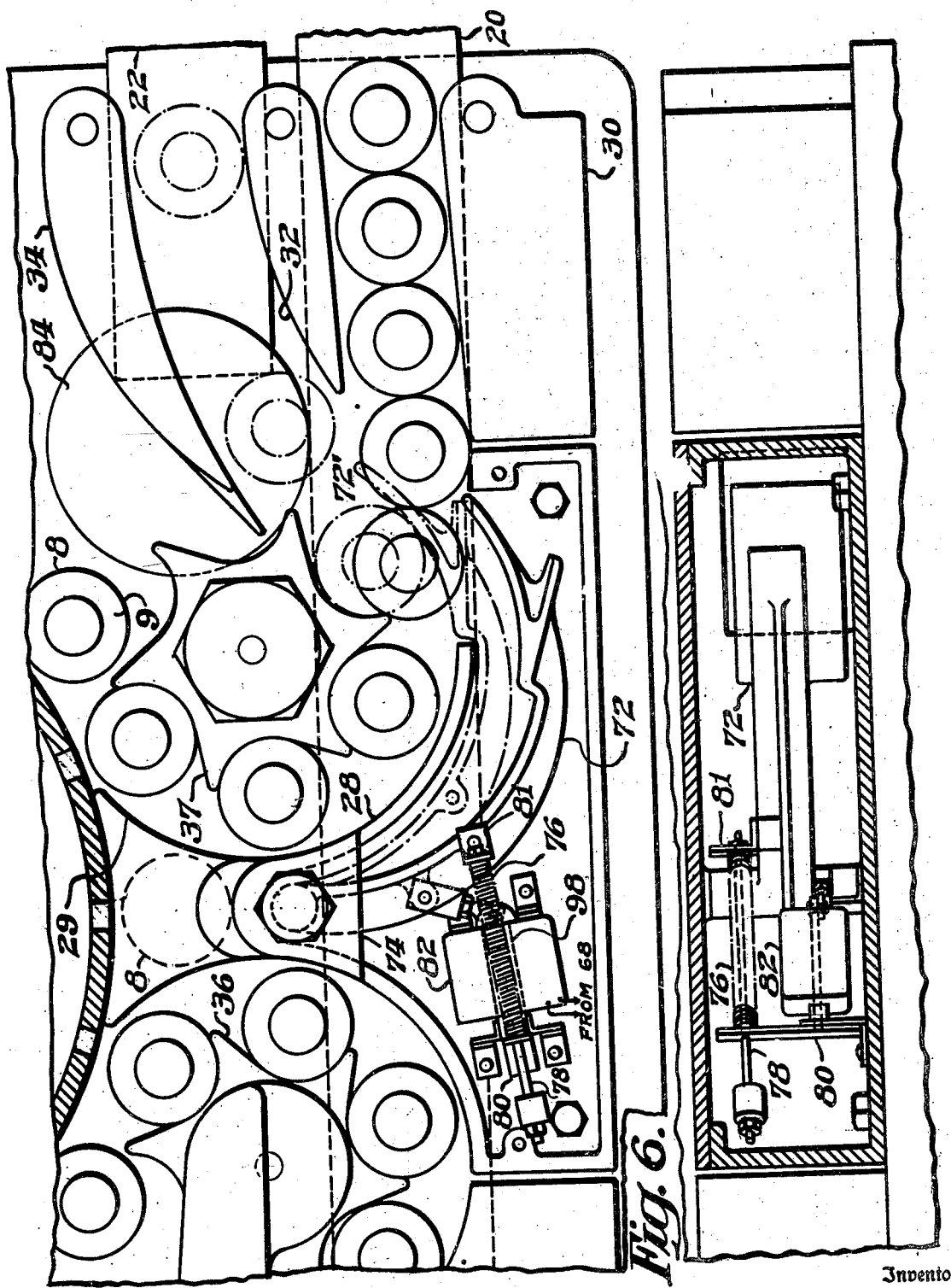

Jan. 15, 1946. J. H. REYNOLDS 2,393,188
INSPECTION MACHINE FOR PACKAGED GOODS
Filed Jan. 25, 1943 5 Sheets—Sheet 5

Inventor
James H. Reynolds
By
Attorney

Patented Jan. 15, 1946

2,393,188

UNITED STATES PATENT OFFICE 2,393,188

INSPECTION MACHINE FOR PACKAGED GOODS

James H. Reynolds, Indianapolis, Ind., assignor to Radio Corporation of America, a corporation of Delaware Application January 25, 1943, Serial No. 473,552

12 Claims. (Cl. 209—74)

My invention relates to an inspection machine for packaged goods, and more particularly to mechanism for rejecting, in a conveyor system, transparent packages or bottles having foreign particles in fluid contained therein. It is in the nature of an improvement over structure disclosed in United States patent to G. P. Stout, No. 2,132,447, issued October 11, 1938.

An object of my invention is to provide a simplified reject mechanism that is positive in its action and free of jamming and bottle breakage.

A further object of my invention is to improve upon the rejecting mechanism disclosed in said patent.

In the operation of a bottle contents inspection machine such as disclosed in Stout U. S. Patent No. 2,132,447 and Reynolds Patent No. 2,253,581, issued August 26, 1941, it is necessary to provide means to time the operation of the amplifier used, to remove the bottle containing foreign material from the turret, and to allow the accepted bottles to pass along the usual conveyor attached to the outfeed of the inspection machine. A still further object of the present invention is to provide a timing device for the operation of the electrical amplifier and to provide means of causing the rejection of a bottle containing foreign material at the proper point on the machine.

Other and incidental objects of my invention will be apparent to those skilled in the art from a reading of the following specification and an inspection of the accompanying drawings, in which:

Figure 2 is a front elevation view of the machine.

Figure 3 is a front elevation view in enlarged size of the inspection and reject timing device.

Figure 4 is an end elevation view, in section, of the reject and amplifier timing device.

Figure 4a is a circuit diagram of the amplifier and relay.

Figure 5 is a plan view in detail of a reject gate shown in dotted lines in Figure 1.

Figure 6 is a front elevation view of the reject gate.

Figure 1:
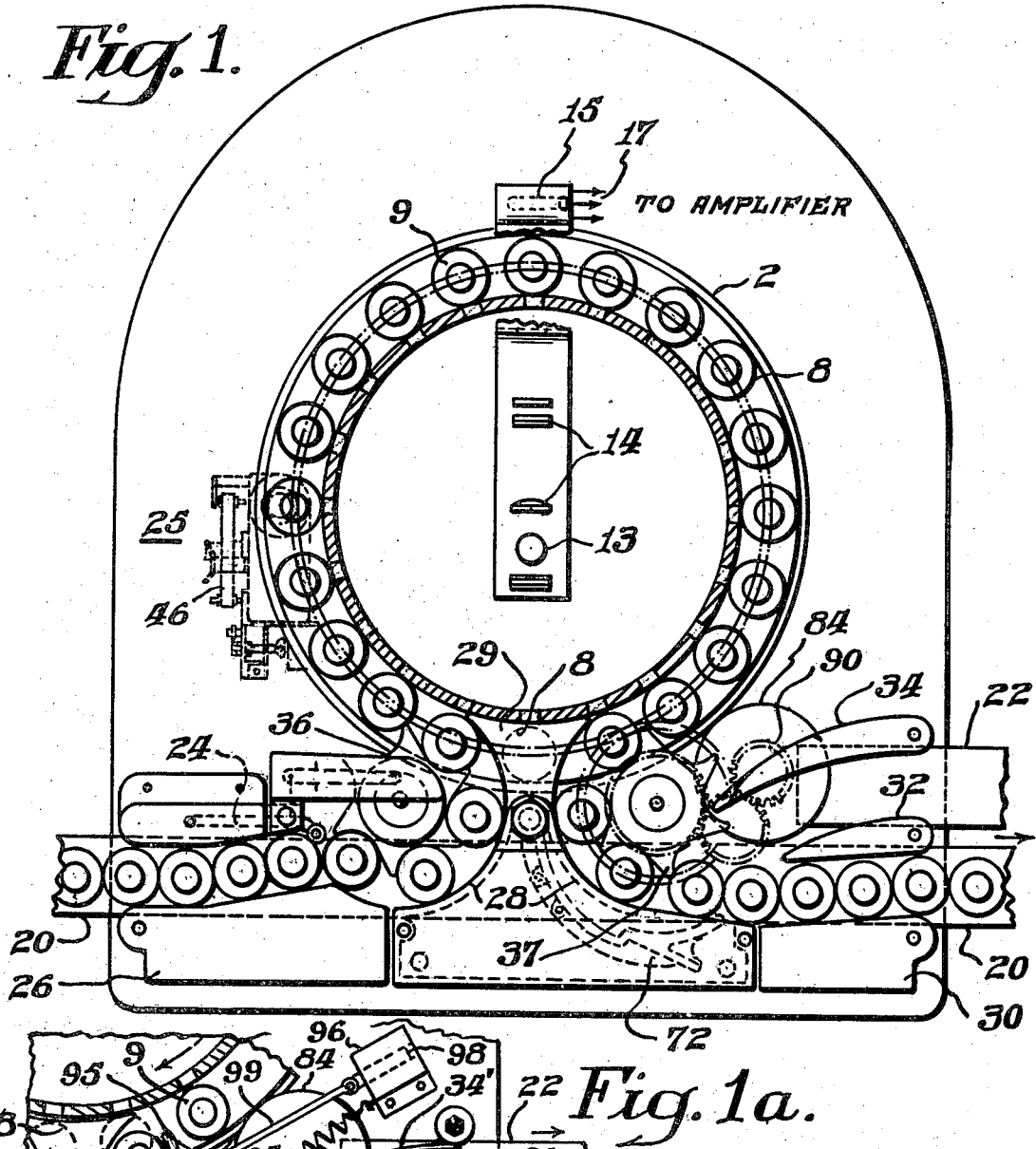
Figure 1 is a plan view of the machine involving my invention.

Referring to Figures 1 and 2, a turret carrier 2 is mounted on a pedestal 4, which in turn is mounted on base 6. The turret is mounted on bearings and is free to revolve in a clockwise direction. The turret 2 carries bottle holders 8 and 10 spaced at equal intervals around the circumference of the turret. These bottle holders are provided with pulleys 12 by which it is possible to spin the bottles 9 rapidly prior to reaching the inspection position between elements 13, 14, and 15, that are, respectively, a light source and optical system, and a bank of phototubes. The phototubes 15 are connected to an amplifier, shown in Figures 4 and 4a, by leads 17 to the input. Mounted on the bottom of the turret 2 is a ring gear 18 by which the turret is made to revolve through connection to a suitable gear reducer and an electric motor, not shown. The machine is provided with an infeed outfeed conveyor belt 20 which passes through the front of the machine, and a reject conveyor means comprising a disc conveyor 84 and a second belt 22 which removes the rejected bottles. There is also an infeed timing mechanism 24, and bottle guides 26, 28, 29, 30, 32, and 34. Infeed starwheel 36 is provided, which in conjunction with the bottle guides shown, receives successively the incoming bottles from the infeed belt 20 and places them in the cups or bottle holders 8 on the turret 2. The guide 28 is a curved outer guide spaced from the starwheel 37 in concentric relation therewith for maintaining said bottles in operative relation to said starwheel, said guide terminating at a point of tangency relative to the line of travel of said belt 20 for releasing said bottles from said starwheel to said belt. The starwheel 37, arranged tangentially relative to the belt 20 and the turret carrier 2, in cooperation with the bottle guide 28 and reject gate 72, removes the bottles from the turret and places the selected or rejected bottles either on conveyor 20 or on the reject conveyor means 84 and 22, as the case may be. An accepted bottle, one containing no foreign material, will be allowed to pass out on conveyor 20, while a bottle containing foreign material will be directed to conveyor means 84 and 22. The belt 22 moves in a substantially parallel direction to belt 20. The inspection processes used are those disclosed in above mentioned Patents 2,132,447 or 2,253,581. In these inspection processes the bottle to be inspected is spun rapidly prior to inspection, and immediately before inspection the rotation of the bottle is stopped, allowing the contents to still rotate.

Figure 7:
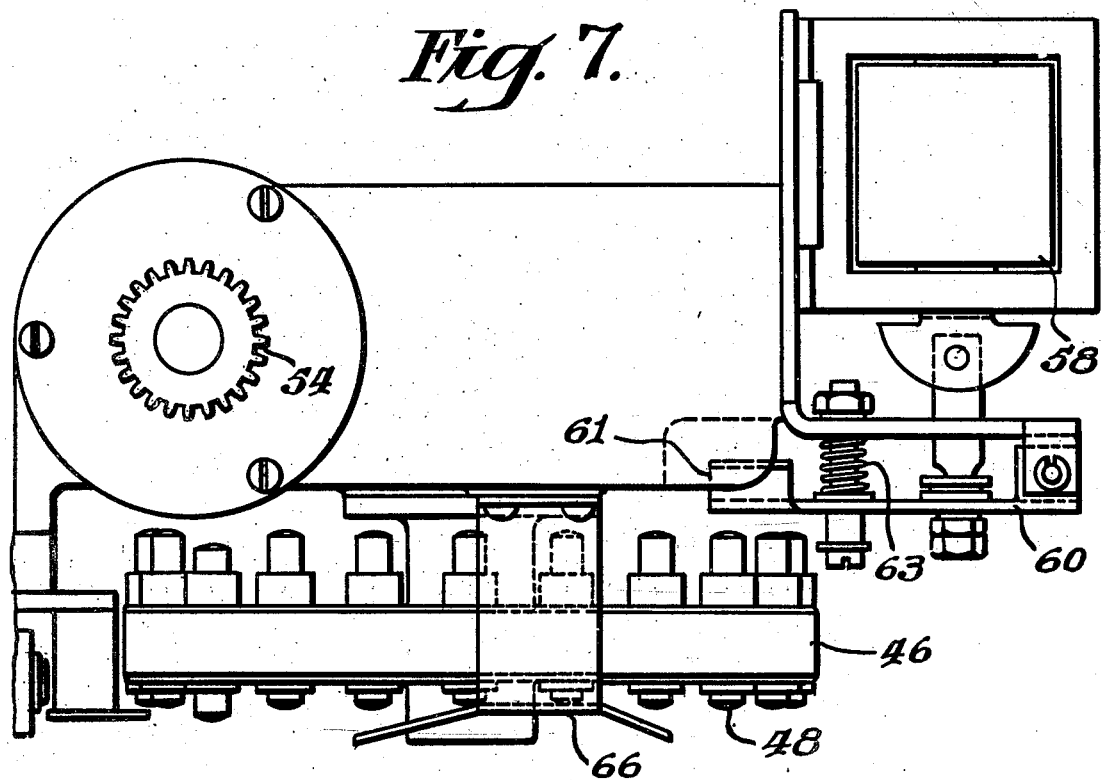
Figure 7 is a plan view of the inspection timing and reject timing device in detail.

Referring to Figure 3 and Figure 4, 38 and 40 are amplifier timing cams operating switches 42 and 44 which respectively control the inspection timing and check signal timing of the amplifier. At the time of inspection a timing device 38 closes switch 42 and completes the plate circuit of the final tube, such as a gas tube type OA4G, in the amplifier 16, allowing the signal from the bottle under inspection to cause the operation of a relay 23 in the plate circuit of this tube. See Figure 4a, for a simplified diagram of the amplifier and bridge relay circuit, in part, used at 16 in Figure 4. This inspection and reject timing device consists of a frame on which is mounted a selector disc 46 which carries reject pins 48, one for each bottle position on the turret 2. The selector disc is driven by the worm 50 and gear 52. Attached to the end of the shaft carrying the worm 50 is the pinion 54 which meshes with the turret ring gear 18 (Fig. 2). The gear ratios are such that the selector disc 46 makes one complete revolution for every revolution of the turret 2, and the shaft carrying the timing cams 38 and 40 makes one revolution while the turret is advancing one bottle position. Connected to reject relay contacts or output terminals 41 of the inspection amplifier and relay, through leads 56, is the solenoid 58 which operates the lever 60 having cam surface 61. See also Figure 7. This lever is normally held in the inoperative position by the local current from source 110 in the solenoid 58. When the reject relay 23 in the amplifier operates, in accordance with a bottle to be rejected, the current to the solenoid 58 is interrupted, and a spring 63 (Figure 7) moves the lever 60 into such a position that the pin 48, which is passing over the cam surface 61 at the time, is pushed outward from the disc. The device of Figures 3 and 4 is shown in dotted lines at 25 in Figure 1.

Figure 8:
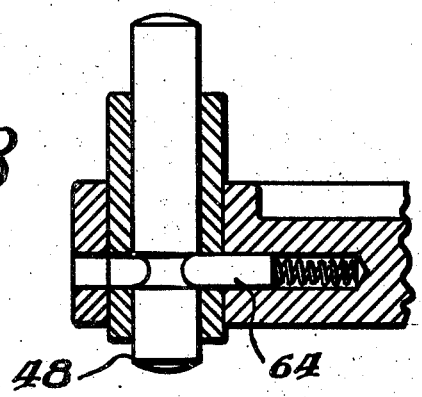
Figure 8 is a detailed section of a reject pin.

A detent pin 64 is provided for the reject pin 48, as shown in Figure 8. A cam 66 is provided for returning any reject pins which have been moved to the reject position, backward to the normal or accepted position. A switch 68 and cam 70 (Figure 3) are provided to actuate the reject gate 72 at the proper time. The solenoid 58 and lever 60 and the switch and cam 68 and 70 are arranged at such intervals that during the time the reject pin has traveled from cam 61 to cam 70, the bottle represented by that pin has moved from the inspection position to the appropriate point on the outfeed starwheel 37.

Referring now to Figures 5 and 6, which show the reject gate assembly in detail, 37 is the outfeed starwheel, 72 is the reject gate, pivotally supported on bearings at 74, which allow it to move in a horizontal plane about bearing 74. The reject gate 72 is held in the reject position, shown by dotted lines 72', by the spring 76, and the rod 78 held in suitable bearings 80 and 81. The reject gate is normally held in the accept position by the solenoid 82 which in turn is controlled by the switch and cam 68 and 70 shown in Figure 3. A reject transfer disc 84 is driven from the ring gear 18 through gears 86, 88, 89, and 90 (Figures 1 and 2). This disc serves to transfer the preselected defective bottle from the outfeed starwheel to the reject conveyor shown at 22. In the rejection of a bottle, the reject gate 72 in response to electrical impulses from the inspection means moves from its normally inoperative position forward across the conveyor 20 but not across the circular path of travel of the bottles, under the influence of the spring 76. The reject gate 72 has substantially the same radius of curvature as the curved outer guide structure 28. This gate then serves as a guide, being co-extensive with guide 28, and the starwheel 37 then carries the bottle further in its curved or circular path to the reject transfer disc and thence to the reject conveyor 22. In effect, the preselected package or bottle is delayed in its release from the starwheel 37. The reject gate is held in the closed position an amount of time determined by the shape of a cam faceplate 71 attached to the cam arm 70. This faceplate is arranged to bear at its righthand edge against the side of a pin that has been raised by the operation of solenoid 58 and lever 60. The selector disc 46 turns in a clockwise direction as viewed in Figure 3, and any raised pin causes arm 70 to move leftward, actuating switch 68 which breaks a local source of power connected to solenoid 82 of Figure 5, thereby permitting the gate to close, as shown in dotted position 72'. Switch 68 is connected through leads 69 to a local source of power and to the solenoid 82.

Figure 1A:
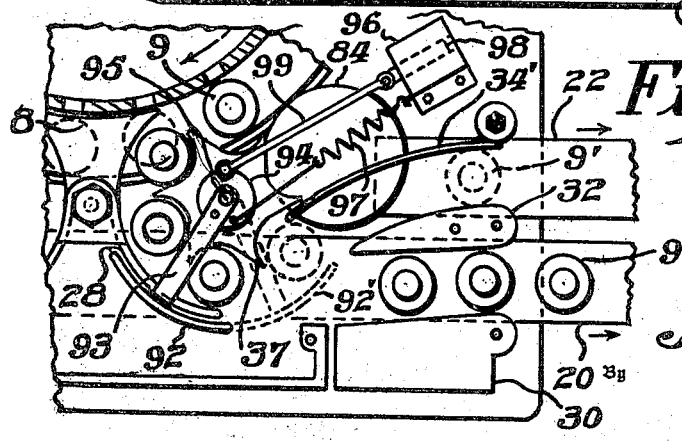
Figure 1a is a fragmentary plan view of a portion of the machine showing a preferred form of my invention.

The above described reject gate shown in Figures 5 and 6, as well as in dotted lines at 72 in Figure 1 has been in successful operation in experimental apparatus. I have shown, however, in Figure 1a an improved form of reject gate that has advantages over the form now in use. Instead of the gate moving laterally to effectively extend the length of the bottle guide 28 to cause a desired bottle to stay with the starwheel until it reaches the reject conveyor disc 84, in the improved form of my invention the guide 28 is effectively extended by circumferential movement of the gate. With this movement there are several advantages including less tendency to bottle breakage. Referring in detail to Figure 1a, a curved reject gate 92 is carried by an arm 93 which is supported on a sleeve 94, in turn pivotally supported on a shaft 95 extending upwardly and connected to the axis of the starwheel 37. Sleeve 94 is free to revolve on shaft 95 and is supported at sufficient height to clear the tops of the bottles. The end of the guide 28 terminates at the point of tangency to the line of travel of the conveyor and the gate 92 lies close to guide 28 as shown. The gate 92 is caused to swing into its reject position 92' which is substantially coextensive with curved guide 28, in response to the deenergization of solenoid 96 and by the action of a spring 97 acting in the same manner as in the other arrangement of Figure 5. The solenoid plunger 98 is connected by a link 99 to a pin on sleeve 94 for exerting torque against that exerted by the spring 97. A torque motor could be used instead and mounted coaxially relative to the starwheel either above or below the wheel, with its shaft connected to arm 93. 95 could be considered as the shaft of a torque motor which might be represented by 94, and which may be mounted below the machine with its shaft extending up through a central bore in the starwheel.

Minor changes may be made in the physical embodiment of or the process involved in my invention without departing from the spirit thereof.

Having thus described my invention, I claim:

1. An inspection machine of the class described, in combination with inspection means, an infeed conveyor belt for packages, a turret carrier for receiving said packages for inspection, a starwheel for transferring said packages successively to said turret from said belt, an outfeed conveyor belt, a second starwheel arranged tangentially relative to said outfeed belt to transfer said packages from said carrier to said outfeed belt, a curved outer guide structure for said packages disposed concentrically relative to said second starwheel for causing said packages to travel in a circular path and terminating at a point of tangency relative to the line of travel of said outfeed belt, conveyor means, a curved gate structure having substantially the same radius of curvature as said outer guide structure mounted in an inoperative position relative to the movement of said packages in said path, actuating means responsive to said inspection means for moving said gate structure into a position substantially coextensive with said curved guide structure without intersecting said path for causing a preselected package to be carried farther in the same circular path by said starwheel into a position of acceptance by said conveyor means.

2. An inspection machine of the class described, in combination with inspection means, an infeed conveyor belt for packages, a turret carrier for receiving said packages for inspection, a starwheel for transferring said packages successively to said turret from said belt, an outfeed conveyor belt, a second starwheel arranged tangentially relative to said outfeed belt to transfer said packages from said carrier to said outfeed belt, a curved outer guide structure for said packages disposed concentrically relative to said second starwheel and terminating at a point of tangency relative to the line of travel of said outfeed belt, reject conveyor means, a curved reject gate structure having substantially the same radius of curvature as said outer guide structure, means for mounting said reject gate structure coaxially relative to said second starwheel, actuating means responsive to said inspection means for moving said gate structure into a position substantially coextensive with said curved guide structure for causing a preselected package to be carried by said starwheel into a position of acceptance by said reject conveyor means.

3. An inspection machine of the class described, in combination with inspection means, an infeed conveyor belt for packages, a turret carrier for receiving said packages for inspection, a starwheel for transferring said packages successively to said turret from said belt, an outfeed conveyor belt, a second starwheel arranged tangentially relative to said outfeed belt to transfer said packages from said carrier to said outfeed belt, a curved outer guide structure for said packages disposed concentrically relative to said second starwheel and terminating at a point of tangency relative to the line of travel of said outfeed belt, reject conveyor means, a curved reject gate structure having substantially the same radius of curvature as said outer guide structure mounted closely adjacent said guide structure in overlapping relation therewith, actuating means responsive to said inspection means for moving said gate structure into a position substantially coextensive with said curved guide structure effectively extending said guiding structure circumferentially a distance sufficient for causing a preselected package to be carried by said starwheel into a position of acceptance by said reject conveyor means.

4. The invention as set forth in claim 1 wherein said conveyor means comprises structure for accepting selected of said packages from said second starwheel in substantial tangential forward relation to said path and a reject conveyor belt arranged to move in a direction substantially parallel to that of said outfeed conveyor belt.

5. A machine for inspecting fluid in transparent packages comprising in combination with inspection means, a carrier for carrying a succession of packages of fluid past said inspection means, a conveyor belt, means comprising a starwheel for transferring said packages in a circular path from said carrier to said belt subsequent to inspection, conveyor means comprising a second conveyor belt arranged to move in a direction substantially parallel to that of said first mentioned belt, a curved gate normally disposed in an inoperative position relative to the movement of said packages in said path, and means responsive to an impulse from said inspection means for causing said gate to move into an operative position without intersecting said path to form a guide substantially concentric to said starwheel and extend said circular path for diverting a preselected package to said conveyor means.

6. The invention as set forth in claim 5 wherein said gate is arranged to move from said inoperative into said operative position laterally inward relative to said starwheel.

7. A machine for inspecting fluid in transparent packages comprising in combination with inspection means, a carrier for carrying a succession of packages of fluid past said inspection means, a conveyor belt, means comprising a starwheel for transferring said packages from said carrier to said belt subsequent to inspection, reject conveyor means, comprising a second conveyor belt arranged to move in a direction substantially parallel to that of said first mentioned belt, a curved reject gate mounted concentrically relative to said starwheel normally disposed in an inoperative position, and means responsive to an impulse from said inspection means for causing said gate to move circumferentially relative to said starwheel to form a guide substantially concentric to said starwheel for diverting a preselected package to said reject conveyor means.

8. An inspection machine for packaged goods in combination with inspection means, a conveyor belt for said packages, a turret carrier for receiving said packages from said belt for inspection, a starwheel disposed in tangential relation to said belt and said turret carrier and geared to said carrier for returning packages successively from said carrier to said conveyor belt, said packages being spaced a short distance relative to their width in the direction of movement, a curved outer guide spaced from said starwheel in concentric relation therewith for maintaining said packages in operative relation with said starwheel in a curved path, said guide terminating at a point of tangency relative to the line of travel of said belt for releasing said packages from said wheel to said conveyor belt, diverting means disposed in an inoperative position relative to the movement of said packages in said path and means actuated in response to electrical impulses received from said inspection means to move said diverting means from said inoperative position into an operative position without intersecting said path for delaying the release of preselected packages from said starwheel.

9. The invention as set forth in claim 8 wherein said diverting means is pivoted at a point externally of said path and swings into its operative position at a point farther along said path whereby said diverting means effectively forms an extension of said guide in a circumferential direction relative to said starwheel.

10. The invention as set forth in claim 8 wherein a reject conveyor means is provided for receiving rejected packages from said starwheel and said diverting means and wherein said reject conveyor means comprises a belt moving in a direction substantially parallel with said conveyor belt.

11. The invention as set forth in claim 8 wherein reject conveyor means is provided for receiving rejected packages from said starwheel in substantially tangential forward direction relative to said path and for causing same to move in a direction substantially parallel to those on said conveyor belt.

12. An inspection machine for packaged goods in combination with inspection means, a conveyor belt for said packages, a turret carrier for receiving said packages from said belt for inspection, a starwheel disposed in tangential relation to said belt and to said turret carrier and geared to said carrier for returning packages successively from said carrier to said conveyor belt, a curved outer guide spaced from said starwheel in concentric relation therewith for maintaining said packages in operative relation with said starwheel in a curved path, said guide terminating at a point of tangency relative to the line of travel of said belt for releasing said packages from said wheel to said conveyor belt, reject means comprising a curved gate of substantially the same shape as said guide mounted in a position adjacent said point of tangency externally of said path, and means actuated in response to electrical impulses received from said inspection means for moving said gate into a second position effectively extending said guide and curved path for delaying the release of preselected packages from said starwheel.

JAMES H. REYNOLDS.